(12) United States Patent
Yildiz et al.

(10) Patent No.: US 10,452,191 B2
(45) Date of Patent: Oct. 22, 2019

(54) SYSTEMS AND METHODS FOR AUTOMATICALLY SWITCHING BETWEEN TOUCH LAYERS OF AN INTERACTIVE WORKSPACE BASED UPON THE USE OF ACCESSORY DEVICES

(71) Applicant: Dell Products, L.P., Round Rock, TX (US)

(72) Inventors: Yagiz Can Yildiz, Austin, TX (US); Jace W. Files, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 110 days.

(21) Appl. No.: 15/796,140

(22) Filed: Oct. 27, 2017

(65) Prior Publication Data

US 2019/0129558 A1 May 2, 2019

(51) Int. Cl.
*G06F 3/041* (2006.01)
*G06F 3/0488* (2013.01)
*G06F 3/0354* (2013.01)

(52) U.S. Cl.
CPC ........ *G06F 3/0416* (2013.01); *G06F 3/03545* (2013.01); *G06F 3/0412* (2013.01); *G06F 3/04883* (2013.01); *G06F 2203/04808* (2013.01)

(58) Field of Classification Search
CPC ........... G06F 2203/04108; G06F 3/017; G06F 3/0338; G06F 3/03545; G06F 3/03547; G06F 3/038; G06F 3/0425; G06F 3/044; G06F 3/04883; G06F 3/0362; G06F 3/0416; G06F 3/0412; G06F 2203/04808
See application file for complete search history.

(56) References Cited

U.S. PATENT DOCUMENTS

| | | | |
|---|---|---|---|
| 2008/0238879 A1* | 10/2008 | Jaeger | G06F 3/03545 345/173 |
| 2013/0038549 A1* | 2/2013 | Kitada | G06F 3/0338 345/173 |
| 2014/0300558 A1* | 10/2014 | Yamaguchi | G06F 3/0416 345/173 |
| 2016/0077616 A1* | 3/2016 | Durojaiye | G06F 3/03545 345/173 |
| 2016/0306483 A1 | 10/2016 | Files et al. | |
| 2017/0255331 A1* | 9/2017 | Yeh | G06F 3/0416 |
| 2017/0269722 A1 | 9/2017 | Krishnakumar et al. | |
| 2018/0074639 A1* | 3/2018 | Powell | G06F 3/044 |
| 2019/0012003 A1* | 1/2019 | Grant | G06F 3/0362 |

* cited by examiner

*Primary Examiner* — Richard J Hong
(74) *Attorney, Agent, or Firm* — Fogarty LLP

(57) ABSTRACT

Systems and methods for automatically switching between touch layers of an interactive workspace based upon the use of accessory devices. In an illustrative, non-limiting embodiment, an Information Handling System (IHS) may include a processor and a memory coupled to the processor, the memory having program instructions stored thereon that, upon execution by the processor, cause the IHS to: determine a first status of a first user interface device and a second status of a second user interface device; and select a touch layer of the IHS based upon the first and second statuses.

11 Claims, 7 Drawing Sheets

SYSTEMS AND METHODS FOR AUTOMATICALLY SWITCHING BETWEEN TOUCH LAYERS OF AN INTERACTIVE WORKSPACE BASED UPON THE USE OF ACCESSORY DEVICES

FIELD

The present disclosure generally relates to Information Handling Systems (IHSs), and, more particularly, to systems and methods for automatically switching between touch layers of an interactive workspace based upon the use of accessory devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems often accept touch inputs. For example, smartphones and tablet computers no longer include a physical keyboard. To interact with these devices, a virtual keyboard is presented to an end-user via a Liquid Crystal Display (LCD), and the user types inputs detected via a capacitive touch surface of the LCD.

Touchscreen LCDs can also support touch inputs other than typed text. For example, a touchscreen LCD may allow end-users to touch the screen to make a mouse input (e.g., to make drag and drop operations) or to draw an image.

Some touchscreen LCDs provide an immersive end-user experience by enabling dual-handed interactions. For example, an end-user may sketch on the LCD with a stylus or pen in one hand, and use a totem in the other hand to simultaneously interact with software menus and presets. A totem may be an electronic dial or knob that engages menus or controls any other programmable operation. For example, with a turn of the totem on one hand, the end-user may activate line weight or color of the pen on the other hand.

A significant difficulty with using touchscreen LCDs is that end-users will often touch the display without the intention to actually make an input—especially when multiple accessories are being used. To reduce the chances of inadvertent input, information handling systems may offer a physical button on the LCD that allows the user to manually select between two or more touch layers. As determined by the inventors hereof, however, having to interact with a physical button during is disruptive to most digital creation workflows.

SUMMARY

Embodiments of systems and methods for automatically switching between touch layers of an interactive workspace based upon the use of accessory devices are described. In an illustrative, non-limiting embodiment, In an illustrative, non-limiting embodiment, an Information Handling System (IHS) may include a processor and a memory coupled to the processor, the memory having program instructions stored thereon that, upon execution by the processor, cause the IHS to: determine a first status of a first user interface device and a second status of a second user interface device; and select a touch layer of the IHS based upon the first and second statuses.

In some implementations, to determine the first status of the first user interface device, the first user interface device may include a first touch sensor configured to determine whether a user is operating the first user interface device. Additionally or alternatively, to determine the second status of the second user interface, the second user interface device may include a second touch sensor configured to determine whether the user is operating the second user interface device. In these cases, the program instructions, upon execution, may cause the IHS to: select the touch layer further based upon whether the user is operating the first, the second, neither, or both user interface devices.

In other implementations, to determine the first status of the first user interface device, the first user interface device may include a first movement, usage, or user presence sensor configured to determine whether a user is operating the first user interface device. Similarly, to determine the second status of the second user interface, the second user interface device may include a second movement, usage, or user presence sensor configured to determine whether the user is operating the second user interface device.

The program instructions, upon execution, may cause the IHS to select the touch layer further based upon whether the user is operating the first, the second, neither, or both user interface devices.

Additionally or alternatively, to determine the first status of the first user interface device, the IHS may include a radio circuit configured to determine a first distance between the IHS and the first user interface device and a second distance between the IHS and the second user interface device. In those cases, the program instructions, when executed by the IHS, may further cause the IHS to determine a relative distance between the first and second user interface devices based upon the first and second distances; and select the touch layer further based upon the relative distance.

In some implementations, the program instructions, upon execution, may cause the IHS to determine whether a user operating the IHS is left or right-hand dominant, and to select the touch layer depending upon whether the user is left or right-hand dominant.

The touch layer may include a palm rejection configuration and a touch processing configuration. To illustrate, the first user interface device may be a totem, and the second user interface device may be a pen. The first status may indicate that a user is not touching the totem, the second status may indicate that the user is not touching the pen, and the touch layer may be configured for finger touch inputs.

Additionally or alternatively, the first status may indicate that a user is touching the totem, the second status may indicate that the user is not touching the pen, palm rejection is enhanced and touch processing is turned on to one side of the pen, and wherein touch processing is turned off to the other side of the pen. Additionally or alternatively, the first status may indicate that a user is not touching the totem, the second status may indicate that the user is touching the pen, and palm rejection may be enhanced to one side of the pen. Additionally or alternatively, the first status may indicate that a user is touching the totem, the second status may indicate that the user is touching the pen, palm rejection may be disabled, and the touch processing may be disabled.

In some cases, the IHS may determine that a user operating the IHS is left-hand dominant. If the first status indicates that a user is touching the totem and the second status indicates that the user is not touching the pen, palm rejection may be enhanced and touch processing may be turned on to the left of the totem, and touch processing may be turned off to the right of the totem. If first status indicates that a user is not touching the totem and the second status indicates that the user is touching the pen, palm rejection may be enhanced to the right of the pen.

In other cases, the IHS may determine that a user operating the IHS is right-hand dominant. If the first status indicates that a user is touching the totem and the second status indicates that the user is not touching the pen, palm rejection may be enhanced and touch processing may be turned on to the right of the totem, and touch processing may be turned off to the left of the totem. If first status indicates that a user is not touching the totem and the second status indicates that the user is touching the pen, palm rejection may be enhanced to the left of the pen.

In another illustrative, non-limiting embodiment, a method may implement one or more of the aforementioned operations. In yet another illustrative, non-limiting embodiment, a hardware memory storage device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
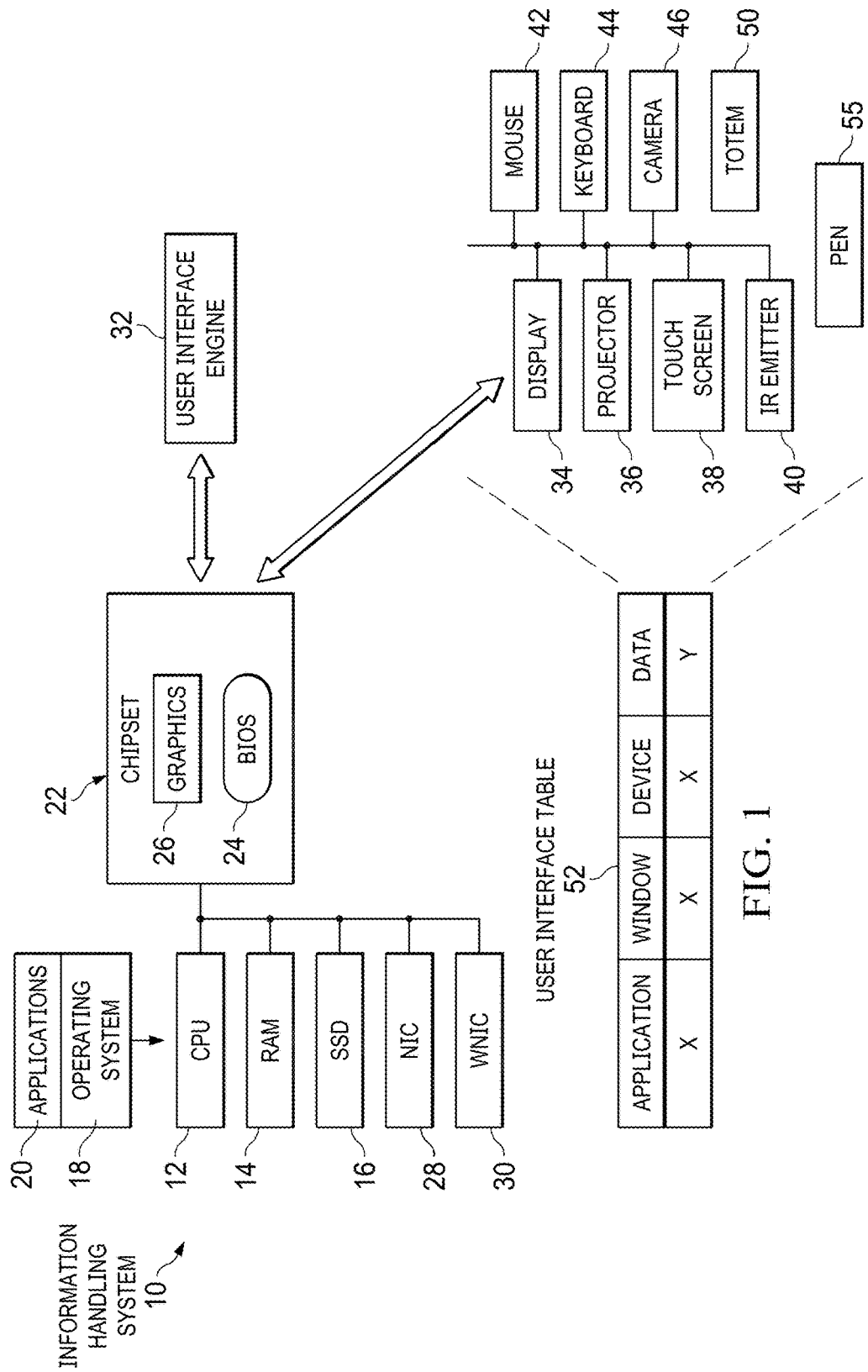
FIG. 1 is a block diagram of a non-limiting example of an Information Handling System (IHS) according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Embodiments described herein provide systems and methods for automatically switching between touch layers of an interactive workspace based upon the use of accessory devices. In various illustrative, non-limiting example, systems and methods described herein discuss the use of a pen and totem as input accessories for a touchscreen or surface integral (or coupled) to an IHS. It should be understood, however, many other accessories may be used. Moreover, these same techniques discussed herein may be applied to other touch, or even gesturing solutions (e.g., a projection or holographic-based system), for instance, whenever those solutions provide multiple input accessories and/or allow dual-handed interactions.

In many embodiments, systems and methods described herein may identify use cases where different "touch layers" or modes are desired, and may provide techniques for automatically and/or seamlessly switching between those layers without end-user commands or actions. Examples of touch layers include, but are not limited to: touch and totem, totem only, and display only. The systems and methods described herein may use sensors in accessories such as pens and totems to predict user presence and actions in order to enable a desired or dynamic touch layer or mode in real time.

For example, ultra-low power capacitive sensors or the like may be integrated onto the pen and totem to identify when an end-user is holding those respective accessories. This information may then be communicated to a touch controller in the touchscreen display of information handling system via Bluetooth Low Energy (BLE) or the like. Additionally or alternatively, an accessory may be detected when it comes into contact with a touch layer detection zone.

End-user's presence information may then be processed by a touch controller in the LCD display, which is configured to perform different layers or modes of touch and palm rejection automatically and/or dynamically and/or adaptively. Based on the end-user's handedness (which may be selected by the user via on-screen display menu), touch can be selectively ignored in certain portions of the LCD, and palm rejection may be performed more aggressively in different digitizer zones when user is holding the pen, totem or both.

Accordingly, systems and methods described herein may provide automatic switching among different modes or layers of touch based on user presence through accessories usage. Additionally or alternatively, these systems and methods may provide techniques for ignoring touch and establishing aggressive palm rejection zones (e.g., implemented using targeted object recognition) based on handedness and/or accessary usage and/or location on the screen. Additionally or alternatively, these systems and methods may provide seamless switching between usage modes based on end-user context.

FIG. 1 is a block diagram of a non-limiting example of an IHS according to some embodiments. IHS 10 processes information with one or more CPUs 12 that execute instructions stored in memory, such as RAM 14. For example, non-volatile memory, such as solid state drive (SSD) 16 or a hard disk drive, stores an operating system 18 that is retrieved to RAM 14 to execute on CPU 12 for supporting applications 20 that generate and modify information in RAM 14 for presentation to an end-user.

Operating system 18 is bootstrapped to an operational state with firmware instructions stored and executed in chipset 22, such as a basic input/output system (BIOS) 24. Chipset 22 includes processing components and firmware instructions to support end user interactions with CPU 12 through input and output devices. For example, chipset 22 includes or interfaces with a graphics system 26 that processes visual information into pixel data for presentation at a display device.

Firmware on chipset 22 also coordinates communications with external devices and networks, such as with a network interface card (NIC) 28 that couples to an Ethernet interface and a wireless NIC (WNIC) 30 that wireless communicates through wireless local area networks (WLAN) such as 802.11 b, g, n and ac networks, through wireless personal area networks (WPAN) such as Bluetooth or 802.11 ad networks.

Although the block diagram of IHS 10 does not indicate a particular form factor, the immersed end user environment described herein may be supported with a variety of form factors including desktop, portable, tablet, smartphone or other types of IHSs.

IHS 10 creates an end-user-immersed environment by managing the presentation of information and acceptance of inputs through a user interface engine 32, such as instructions executing in one or more of CPU 12, chipset 22 and individual input and output components like those described below.

Display 34 interfaces with graphics system 26 to receive pixel information that is presented as visual images. Display 34 may be configured as an integrated device, such as in a tablet, laptop or convertible IHS, or as a peripheral device coupled through a cable or wireless interface. Projector 36 may be, for example, a display device that projects pixel information against a projection surface, such as a desktop surface.

Touchscreen LCD display 38 is a flat peripheral that rests on a surface, such as a desktop, to present visual information to an end user and to accept inputs from the end-user with integrated capacitive touch sensors. Infrared emitter 40 may project infrared light to aid in touch detection and/or resolution of three dimensional images captured by camera 46. For example, infrared emitter 40 projects an IR curtain just above a surface to detect touches at the surface that pass through the IR curtain.

As another example, infrared emitter 40 may project structured light that does not disrupt the end-user but provides camera 46 with depth information that aids analysis of images to detect body parts, such as fingers and hands, and dimensions. User interface engine 32 manages inputs and outputs to other types of devices, including a mouse 42, keyboard 44, camera 46, and/or touchscreen 38.

User interface engine 32 may apply images captured by camera 46 with or without enhancements by infrared emitter 40 to manage input devices or touchscreen accessories, such as totem 50 or pen 55, that an end-user manipulates to indicate inputs. User interface engine 32 may also track input and output devices relative to applications, windows, and content data with user interface table 52 that allows transitions of content between available output devices.

Figure 2:
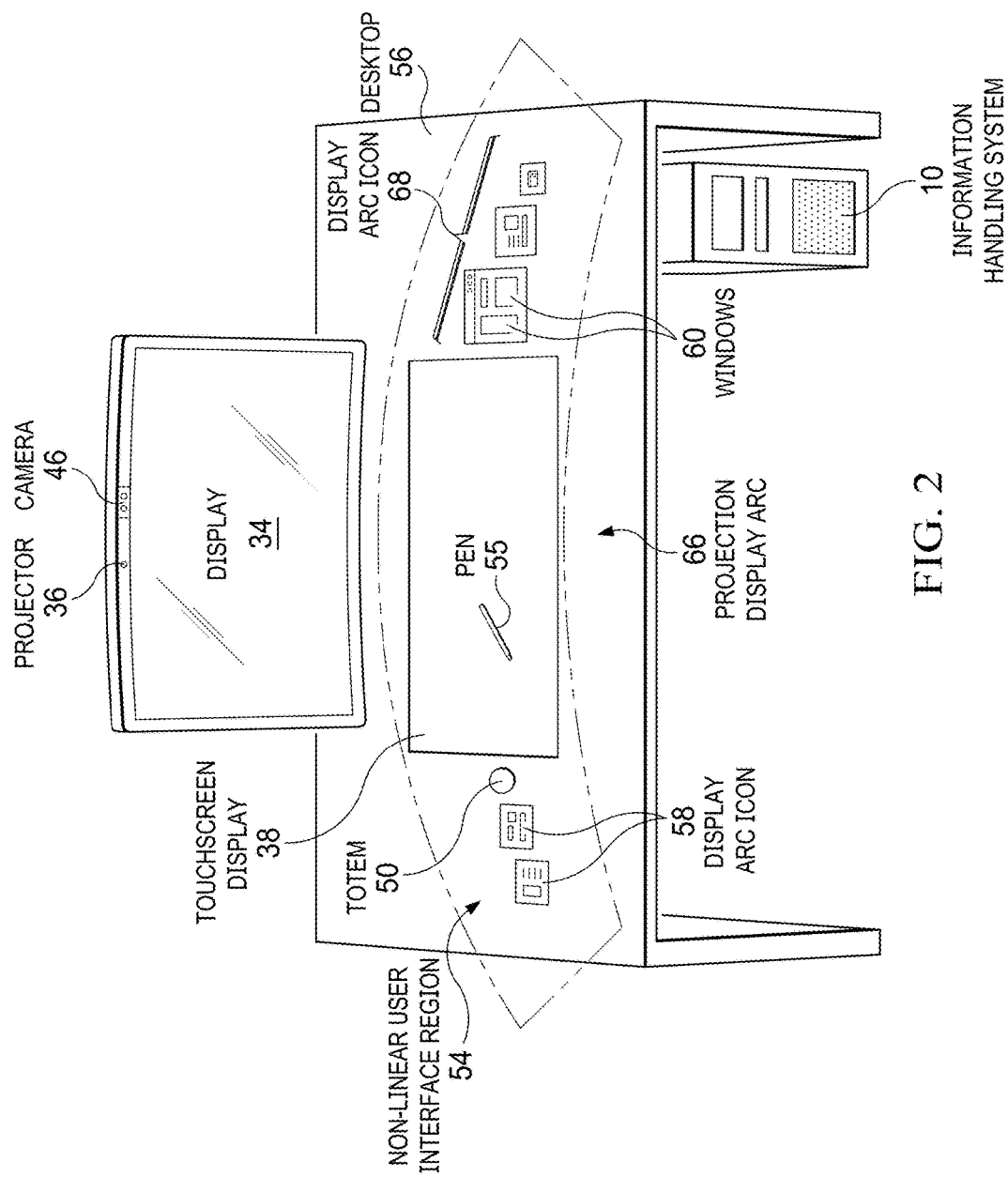
FIG. 2 is a perspective view of a non-limiting example of an Information Handling System (IHS) according to some embodiments.

Referring now to FIG. 2, a perspective view of a non-limiting example of IHS 10 is depicted. In larger immersed end-user environments that include horizontal input devices, non-linear user interface region 52 reflects an arc centered around the end-user, and creates a sense of immersion by wrapping visual content around that end-user that adapts to the end-user's reach and interactions. Depth camera 46 may measure the end-user's physical presence to define an arc radius adapt to the end user's arm-length, reach, posture and/or other factors, so that the presentation of visual information allows a fluid immersion that keeps content highlighted for viewing with adaptive window sizes based upon a view direction of an end user.

IHS 10 may support end-user interactions at a desktop 56 under management of user interface engine 32. Although desktop 56 is depicted as a work environment centered at a desk surface, in alternative embodiments alternative work surfaces may be used with alternative arrangements of input and output devices.

One or more detection devices, such as camera 46, detects positional information for a user relative to desktop 56 to define non-linear user interface region 54. One or more projectors 36 populate non-linear user interface region 54 with display arc icons 58 that each include one or more windows 60 having content associated with applications. Sets of one or more display arc icons 58 may be presented in projection display arcs 66 having a radius centered at an end user's point of shoulder rotation for the side of desktop 56 on which the projection display arc 66 is presented.

For instance, end-user touches or gestures may be detected by camera 46 or touchscreen display 38, and interpreted by user interface engine 32 to move content between presentation environments by having the graphics system define appropriate pixel information for display 34, projector 36, and/or touchscreen display 38.

In addition to detecting end-users' touches and gestures, user interface engine 32 may analyze determine inputs made through totem 50 or pen 55. In some embodiments, totem 50 and pen 55 may interact with capacitive touch sensors of touchscreen LCD display 38 to provide inputs from an end-user to IHS 10. For example, in some cases totem 50 and pen 55 may be "dumb" devices that indicate inputs based upon orientation or end user hand motions in their proximity. In other cases, however totem 50 and/or pen 55 may both include sensing, processing, and/or communications capabilities that enable them to acquire, receive, and/or send data to IHS 10.

Figure 3:
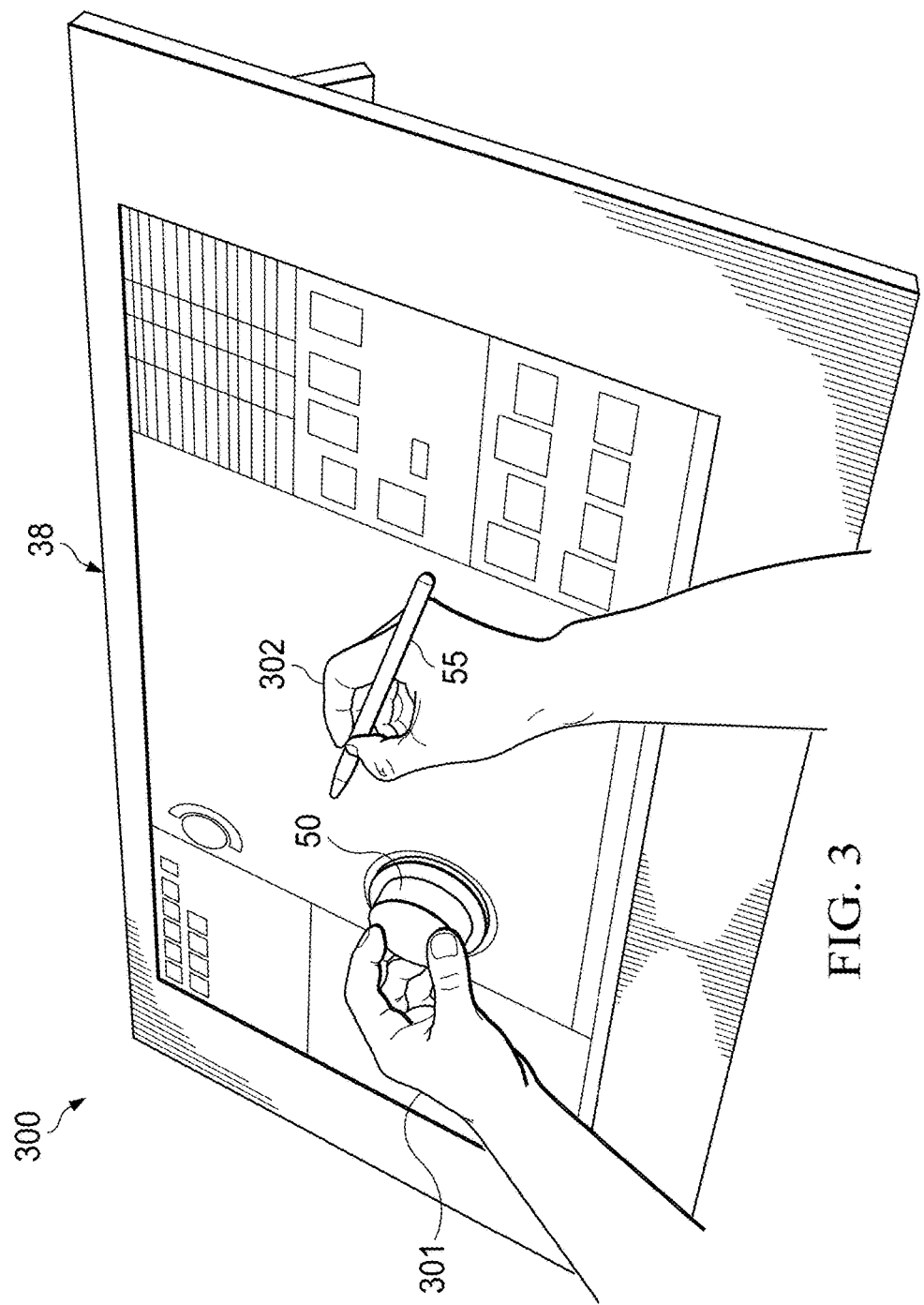
FIG. 3 is a perspective view of a non-limiting example of a touchscreen display according to some embodiments.

FIG. 3 is a perspective view of a non-limiting example of touchscreen display 38 according to some embodiments. As shown, end-user 300 interacts with IHS 10 via touchscreen 38 using token 50 in left hand 301 (e.g., as a dial or button), and pen or stylus 55 in right hand 302. In many cases, touchscreen 38 may also accept finger gestures from left hand 301 or right hand 302.

In some embodiments, touchscreen 38 may include different "touch layers" or modes of operation, and may it provide techniques for automatically and/or seamlessly switching between those layers without explicit end-user commands or actions. Each touch layer may include a number of parameters, including: (i) at least one palm rejection configuration parameter (e.g., a targeted object recognition parameter), and (ii) at least one touch (or finger touch) processing configuration parameter.

A palm rejection algorithm may include a "large object" detection algorithm designed to reject touch events that encompass an area of greater than a selected threshold size, such as 25 mm. In some cases, the threshold size of the rejection area may be used as a palm rejection configuration parameter. For example, the threshold size may be reduced to increase the aggressiveness of the palm rejection algorithm, or it may be increased to reduce it. An "enhanced" palm rejection algorithm may be created that is more aggressive than a standard or default palm rejection algorithm by having a smaller threshold size value.

Such input detection algorithms tend to have low-latency requirements so that end-users do not experience excessive delays between the timing of an input and the presentation of the input at touchscreen 38. The low latency often means that initial small areas of touch that precede a larger touch area may be detected as an intended touch and presented as such to the end user. For example, an unintended dot or line is written before the palm rejection algorithm engages to reject further touch events. Typically, when writing with a finger a user will not rest his palm on touchscreen 38; however, when writing with pen 55, for example, an end-user often will rest his palm or arm 302 on touchscreen 38 to produce an unintended dot or line. In some cases, the latency requirement may be used as a palm rejection configuration parameter. The latency requirement may be increased (a smaller time value), for example, to increase the aggressiveness of the palm rejection algorithm; and reduced, to decrease such aggressiveness.

A touch processing algorithm may select one or more exclusively active digitizer zones of touchscreen 38 where touch inputs, whether via pen 55, totem 50, or a user's finger, are allowed. Other zones of may be turned off or otherwise rendered inactive during operation of touchscreen 38, thus potentially saving energy and/or reducing latency. In some implementations, active and/or inactive digitizer zones may include vertical or horizontal portions of touchscreen 38; in other implementations, however, active and/or inactive digitizer zones may take other shapes and sizes. In some cases, an identification of the active and/or inactive digitizer zones may be used as a touch processing configuration parameter. The size of the overall inactive touch area may be increased, for example, to preserve energy and/or to reduce latency.

In order to reduce unintended inputs, touchscreen 38 may be configured to engage a selected one of a plurality of different layers or modes of touch based on the end-user's presence information (as detected by totem 50 and/or pen 55) and/or depending upon the end-user's handedness (which may be selected by the user via on-screen display menu). In some cases, touch can be selectively ignored in certain portions of touchscreen 38, and palm rejection may be performed more aggressively in different digitizer zones depending upon whether end-user 300 is holding pen 55, totem 50, neither, or both.

Figure 4:
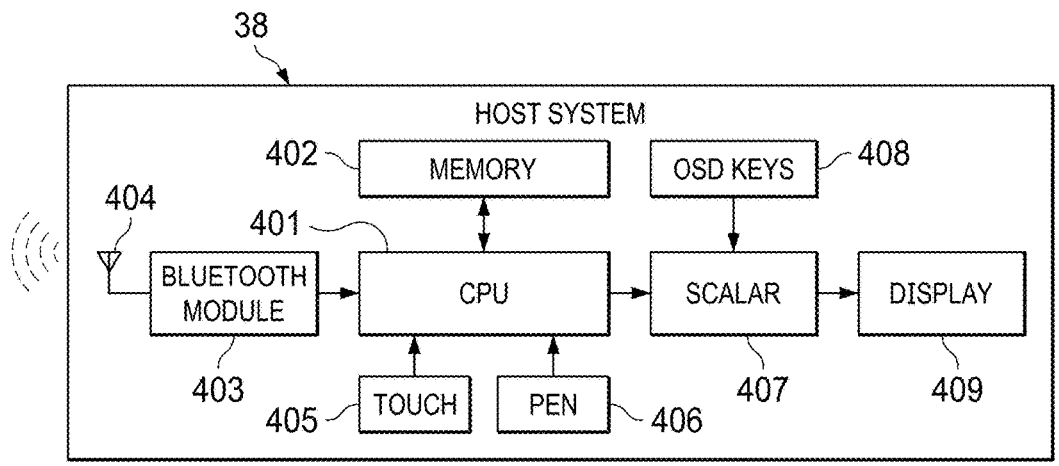
FIG. 4 is a block diagram of a non-limiting example of a touchscreen host according to some embodiments.

FIG. 4 is a block diagram of a non-limiting example of a touchscreen host. In some embodiments, touchscreen 38 may include such a host. As shown, touchscreen 38 includes CPU 401, memory 402, BT module 403, antenna 404, touch sensor(s) 405, pen sensor(s) 406, scalar 406, OSD keys 408, and display 409.

Figure 5:
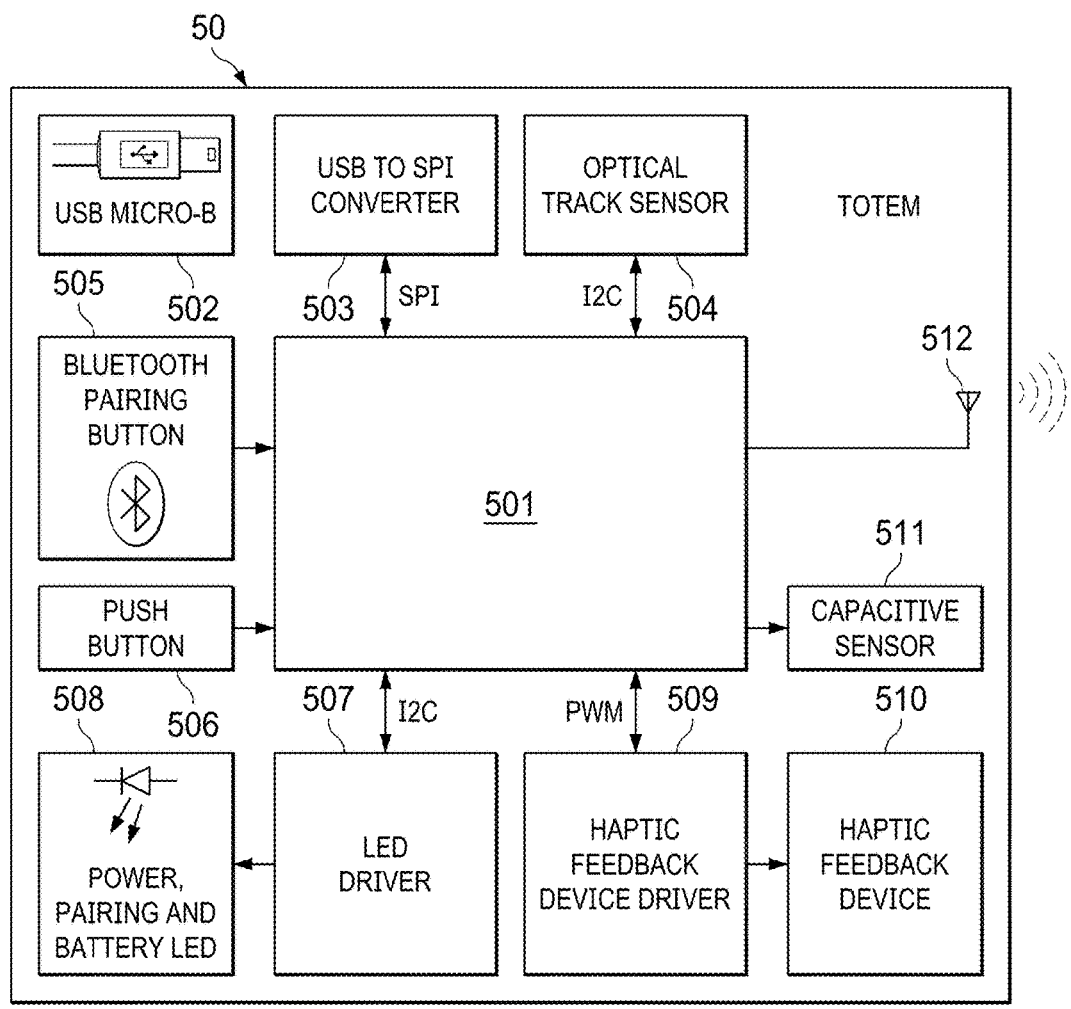
FIG. 5 is a block diagram of a non-limiting example of a totem according to some embodiments.

FIG. 5 is a block diagram of a non-limiting example of a totem. In some embodiments, totem 50 may be implemented as shown. Particularly, totem 50 includes controller 501, USB-B port or controller 502, USB to SPI converter 503, optical track sensor 504, BT pairing button 505, push button 506, LED driver 507, pairing and battery LED 508, haptic feedback device driver 509, haptic feedback device 510, capacitive or touch sensor 511, and antenna 512.

Figure 6:
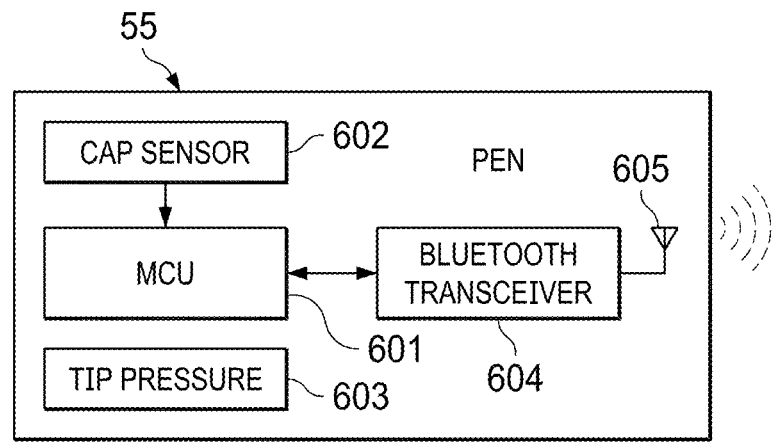
FIG. 6 is a block diagram of a non-limiting example of a pen according to some embodiments.

FIG. 6 is a block diagram of a non-limiting example of a pen according to some embodiments. In some embodiments, pen 55 may be implemented as shown. Specifically, pen 55 includes MCU 601, capacitive or touch sensor 602, tip pressure sensor 603, Bluetooth transceiver 604, and antenna 605.

Figure 7:
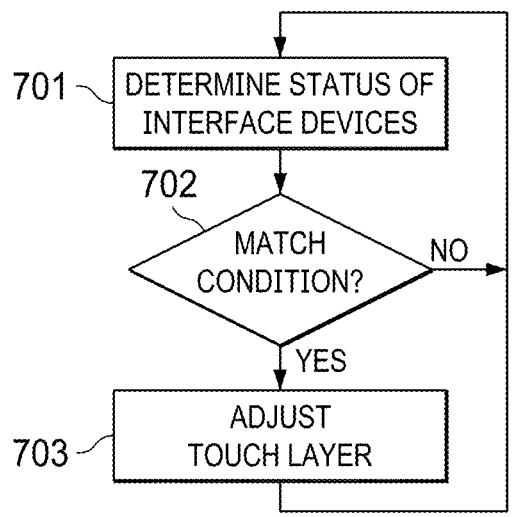
FIG. 7 is a flowchart of a non-limiting example of a method for automatically switching between touch layers of an interactive workspace based upon the use of accessory devices according to some embodiments.
Figure 8:
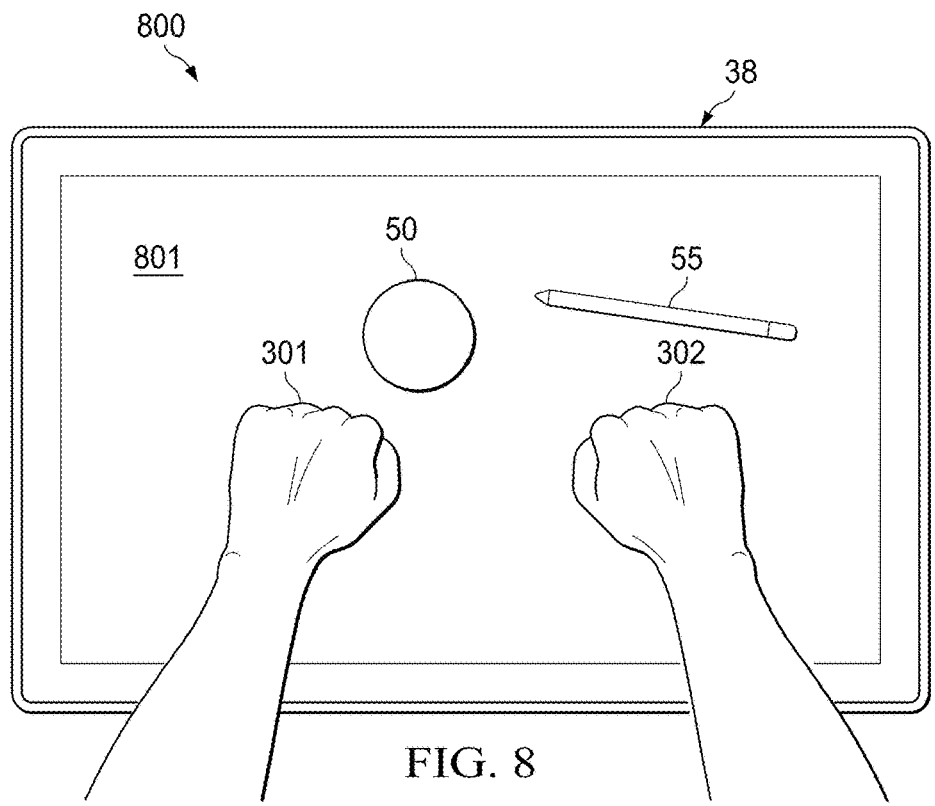
FIGS. 8-11 are top views of non-limiting examples of different touch layers according to some embodiments.

FIG. 7 is a flowchart of a non-limiting example of a method for selecting touch layers of an interactive workspace based upon the use of accessory devices according to some embodiments. In some cases, method 700 may be performed by touchscreen 38 and/or IHS 10. At block 701, method 700 determines the status of one or more interface devices or touchscreen accessories, such as totem 50 and pen 55.

For example, the touchscreen accessory may include a touch sensor configured to determine whether the end-user is operating that accessory. Additionally or alternatively, the touchscreen accessory may include a movement sensor (e.g., an accelerometer or gyroscope) configured to determine whether the end-user is operating that accessory. Additionally or alternatively, the touchscreen accessory may include a radio circuit (e.g., Bluetooth interface) configured to determine whether the end-user is operating that accessory.

The radio circuits between two accessories may operate with the host's radio circuit to allow the host to determine a first distance between the host and the totem and a second distance between the host and the pen. Additionally or alternatively, radio circuits between two accessories may determine a relative distance between the totem and the pen.

At block 702, method 700 determines whether one or more conditions are met that suggest a change in the way touchscreen 38 processes inputs. At block 703, method 700 switches or adjusts the touch layer or mode being used by touchscreen 38 in response to the condition being matched in block 702.

In that regard, Table I below illustrates non-limiting examples of conditions 702 and adjustments 703 that may be checked and performed by method 700. In various embodiments, adjustments 703 may include palm rejection and touch processing adjustments as follows:

TABLE I

| Status/Condition | Palm Rejection Adjustment | Touch Processing Adjustment |
|---|---|---|
| User not touching totem or pen | Standard | Finger touch optimized. Totem processing disabled |
| User only touching totem | Enhanced palm rejection to the right of the totem | Ignore touch to the left of the totem. Finger touch optimized to the right of the totem |
| User only touching pen | Enhanced palm rejection to the left of the pen | Ignore touch to the right of the pen. Finger touch optimized to the left of the pen |
| User touching both pen and touch | Disabled | Disabled |

It should be noted that Table I provides an example in cases where the end-user is right-hand dominant. When the user is left-hand dominant, a symmetric approach may be followed, and these settings may be selected by the end-user via a software menu or the like.

FIGS. 8-11 are top views of non-limiting examples of different touch layers of touchscreen 38 according to some embodiments. When the touchscreen accessories have the status shown in configuration 800 of FIG. 8, a right-hand dominant end-user is not touching either totem 50 or pen 55 with the left or right arms/hands 301 and 302, respectively. In this case, a first touch layer may be automatically selected in block 703 whereby palm rejection adjustments need not be made (standard configuration parameters may be used), finger touch is optimized, and totem processing is disabled.

Figure 9:
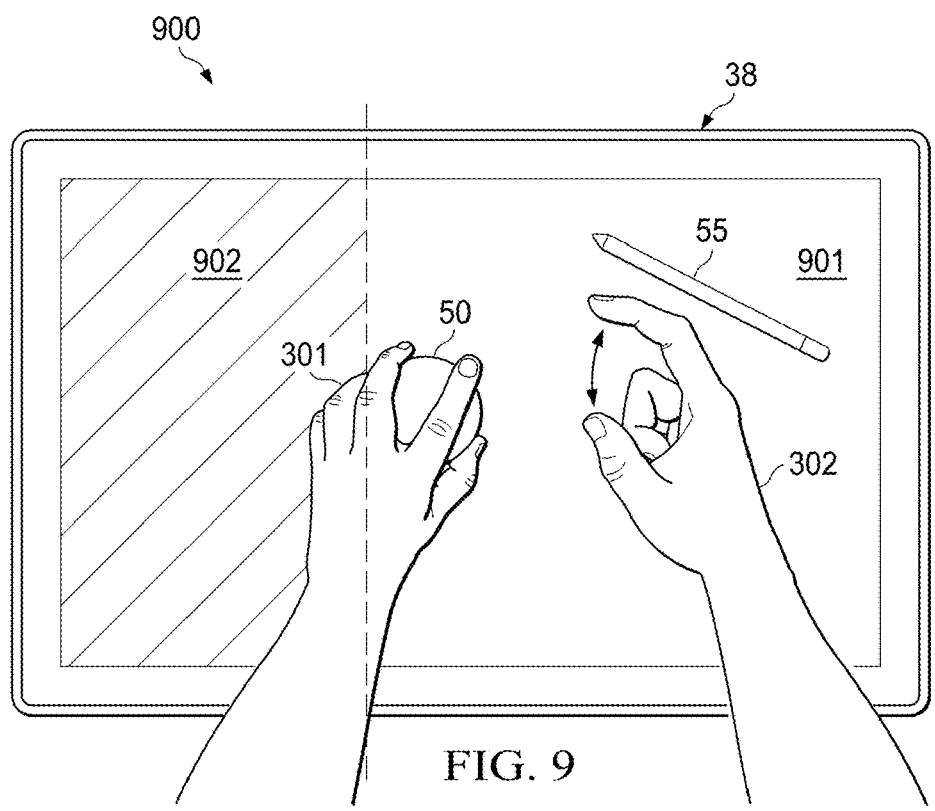

When the touchscreen accessories have the status shown in configuration 900 of FIG. 9, the right-hand dominant end-user is touching totem 50 but is not touching pen 55 with the left and right arms/hands 301 and 302, respectively. In this case, a second touch layer may be automatically selected in block 703 whereby touchscreen 38 provides enhanced palm rejection to the right 901 of totem 50, touchscreen 38 ignores touch to the left 902 of totem 50, and touchscreen 38 is touch-optimized to the right 901 of totem 50.

Figure 10:
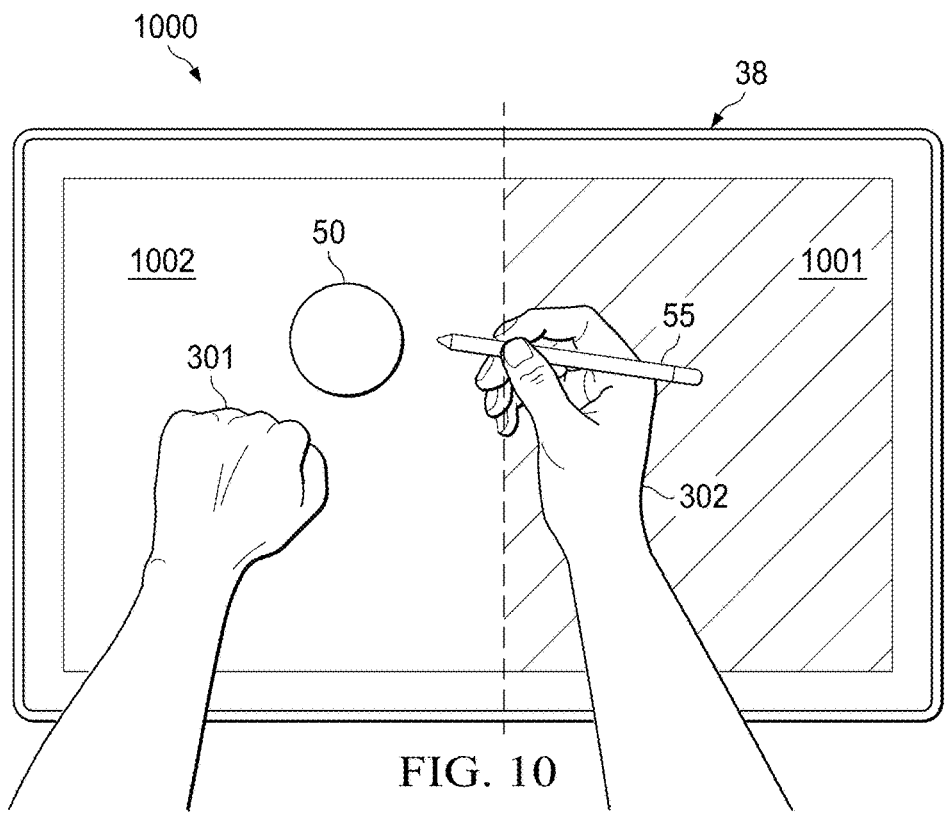

When the touchscreen accessories have the status shown in configuration 1000 of FIG. 10, the right-hand dominant end-user is touching both pen 55 but is not touching totem 50 with the right and left arms/hands 302 and 301, respectively. In this case, a third touch layer may be automatically selected in block 703 whereby touchscreen 38 provides enhanced palm rejection to the left 1002 of pen 55, touchscreen 38 ignores touch to the right 1001 of pen 55, and touchscreen 38 is touch-optimized to the left 1002 of pen 55.

Figure 11:
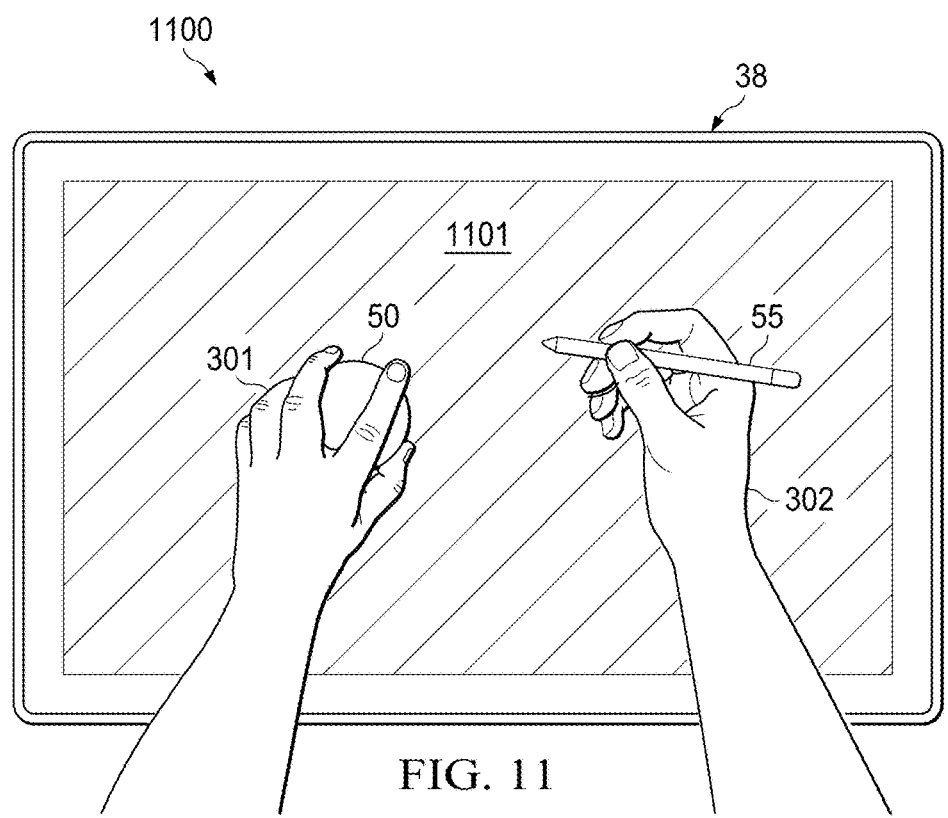

When the touchscreen accessories have the status shown in configuration 1100 of FIG. 11, the right-hand dominant end-user is touching both totem 50 and pen 55 with the left or right arms/hands 301 and 302, respectively. In this case, a fourth touch layer may be automatically selected in block 703 whereby palm rejection and touch processing adjustments are turned off. In this case, all areas of touchscreen 38 are active with workflow configuration parameters being applied.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
  determine a first status of a first user interface device and a second status of a second user interface device, wherein the first user interface device is a totem, and wherein the second user interface device is a pen; and
  select a touch layer of the IHS based upon the first and second statuses, wherein at least one of:
    (a) the first status indicates that a user is touching the totem, the second status indicates that the user is not touching the pen, palm rejection is enhanced and touch processing is turned on to one side of the totem, and touch processing is turned off to the other side of the totem;
    (b) the first status indicates that a user is not touching the totem, the second status indicates that the user is touching the pen, palm rejection is enhanced and touch processing is turned on to one side of the pen, and touch processing is turned off to the other side of the pen; or
    (c) the first status indicates that a user is touching the totem, the second status indicates that the user is touching the pen, palm rejection is disabled, and touch processing is disabled.

2. The IHS of claim 1, wherein to determine the first status of the first user interface device, the first user interface device includes a first touch sensor configured to determine whether a user is operating the first user interface device, wherein, to determine the second status of the second user interface, the second user interface device includes a second touch sensor configured to determine whether the user is operating the second user interface device, and wherein the program instructions, upon execution, further cause the IHS to:
select the touch layer further based upon whether the user is operating the first, the second, neither, or both user interface devices.

3. The IHS of claim 1, wherein to determine the first status of the first user interface device, the first user interface device includes a first movement, usage, or user presence sensor configured to determine whether a user is operating the first user interface device, and wherein, to determine the second status of the second user interface, the second user interface device includes a second movement, usage, or user presence sensor configured to determine whether the user is operating the second user interface device.

4. The IHS of claim 3, wherein the program instructions, upon execution, further cause the IHS to:

select the touch layer further based upon whether the user is operating the first, the second, neither, or both user interface devices.

5. The IHS of claim 1, wherein to determine the first status of the first user interface device, the IHS includes a radio circuit configured to determine a first distance between the IHS and the first user interface device and a second distance between the IHS and the second user interface device, and wherein the program instructions, when executed by the IHS, further cause the IHS to:

determine a relative distance between the first and second user interface devices based upon the first and second distances; and select the touch layer further based upon the relative distance.

6. The IHS of claim 1, wherein the program instructions, upon execution, cause the IHS to:

determine whether a user operating the IHS is left or right-hand dominant; and select the touch layer depending upon whether the user is left or right-hand dominant.

7. The IHS of claim 1, wherein the touch layer includes a palm rejection configuration and a touch processing configuration.

8. The IHS of claim 1, wherein the first status indicates that a user is not touching the totem, wherein the second status indicates that the user is not touching the pen, and wherein the touch layer is configured for finger touch inputs.

9. A hardware memory storage device having program instructions stored thereon that, upon execution by a processor of an Information Handling System (IHS), cause the IHS to:

determine a first status of a first user interface device and a second status of a second user interface device, wherein the first user interface device is a totem, and wherein the second user interface device is a pen; and select a touch layer of the IHS based upon the first and second statuses, wherein at least one of:

(a) the first status indicates that a user is touching the totem, the second status indicates that the user is not touching the pen, palm rejection is enhanced and touch processing is turned on to the left of the totem, and touch processing is turned off to the right of the totem;

(b) the first status indicates that a user is not touching the totem, the second status indicates that the user is touching the pen, palm rejection is enhanced and touch processing is turned on to the right of the pen, and touch processing is turned off to the left of the pen; or (c) the first status indicates that a user is touching the totem, the second status indicates that the user is touching the pen, palm rejection is disabled, and touch processing is disabled.

10. The hardware memory storage device of claim 9, wherein the program instructions, upon execution, further cause the IHS to determine that a user operating the IHS is left-hand dominant.

11. A method, comprising:

determining a first status of a totem and a second status of a pen;

determining that a user is right-hand dominant; and automatically switching between different touch layers of an Information Handling System (IHS) based upon the first status, the second status, and the right-hand dominance, wherein the touch layer includes palm rejection and touch processing, and wherein at least one of:

(a) the first status indicates that the user is touching the totem, the second status indicates that the user is not touching the pen, palm rejection is enhanced and touch processing is turned on to the right of the totem, and touch processing is turned off to the left of the totem;

(b) the first status indicates that the user is not touching the totem, the second status indicates that the user is touching the pen, palm rejection is enhanced and touch processing is turned on to the left of the pen, and touch processing is turned off to the right of the pen; or (c) the first status indicates that a user is touching the totem, the second status indicates that the user is touching the pen, palm rejection is disabled, and touch processing is disabled.

* * * * *